Dec. 4, 1962 M. LEVY 3,066,721
APPARATUS FOR FORMING CYLINDRICAL TUBES
WITH JOINED OVERLAPPED EDGES
Filed Aug. 5, 1959 6 Sheets-Sheet 4
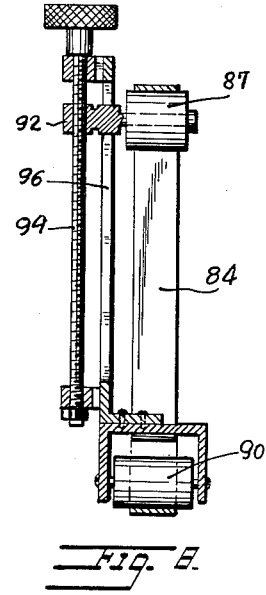
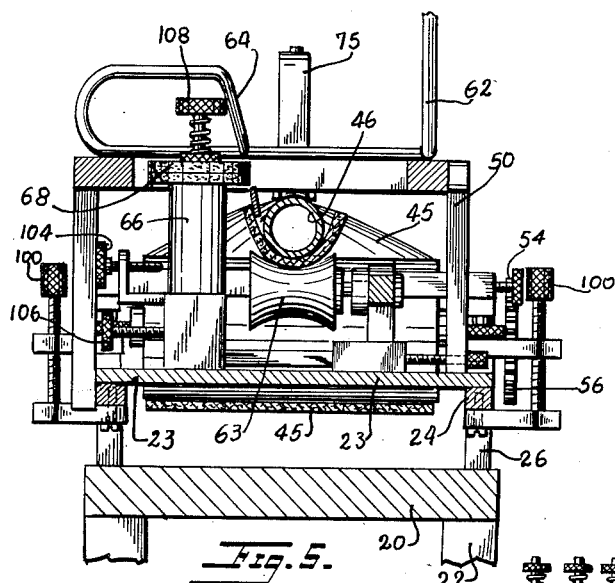
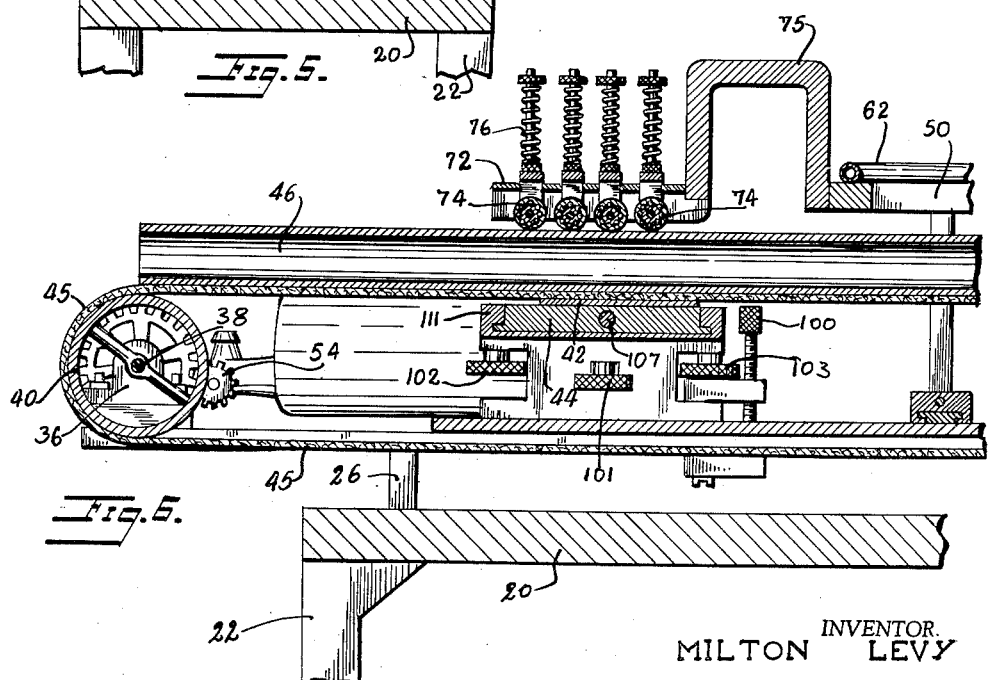
INVENTOR.
MILTON LEVY
BY
ATTORNEY

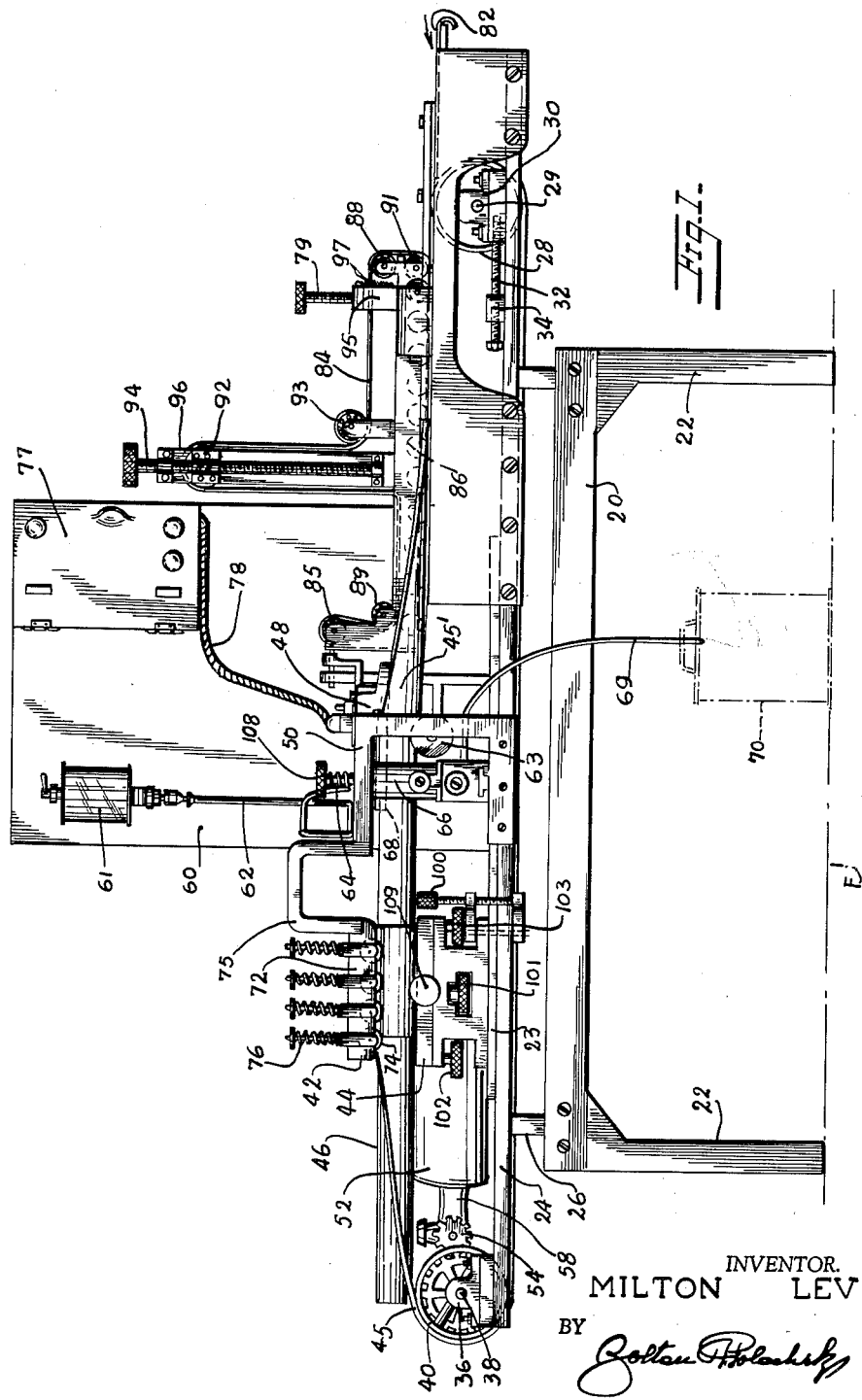

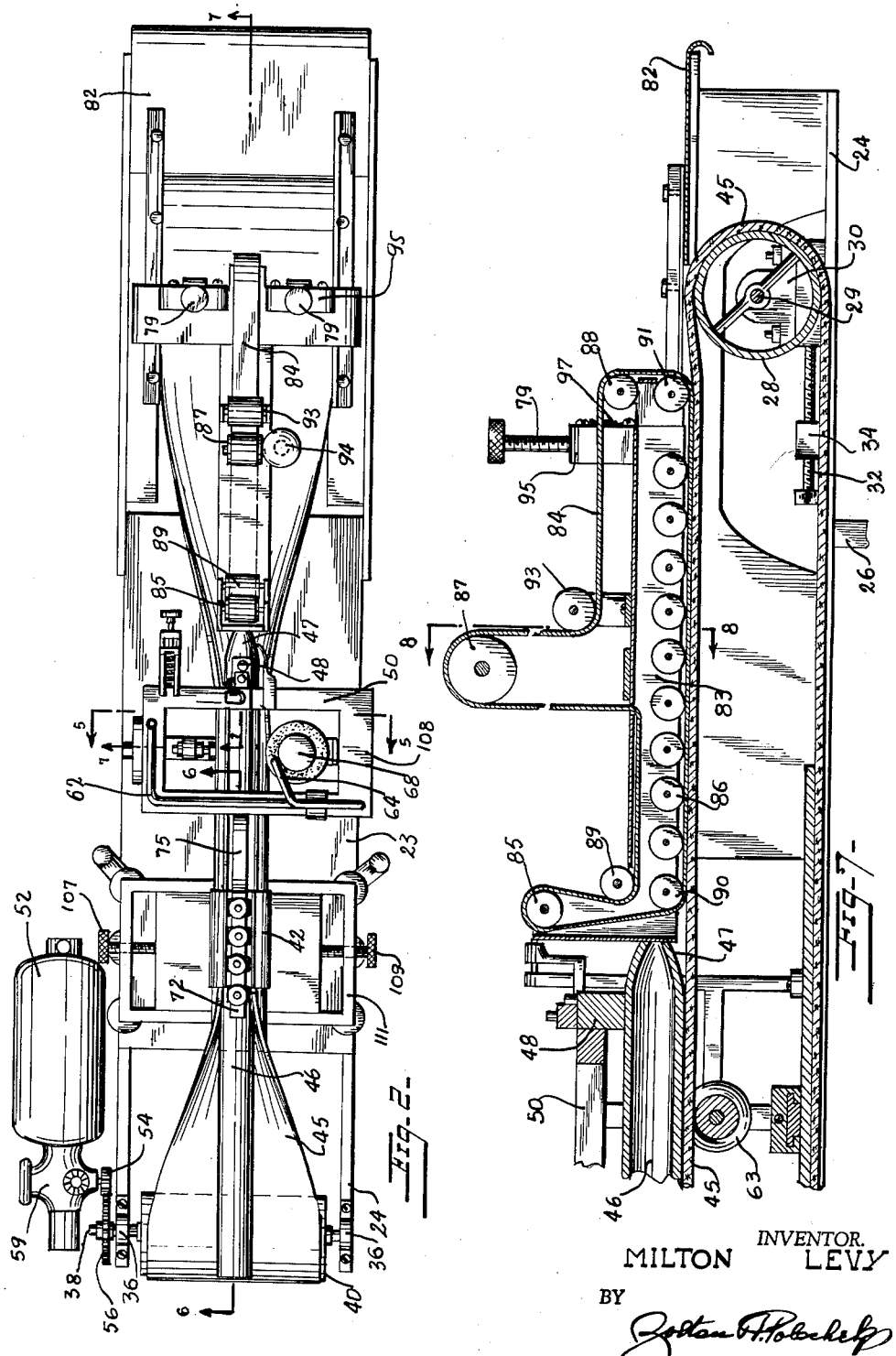

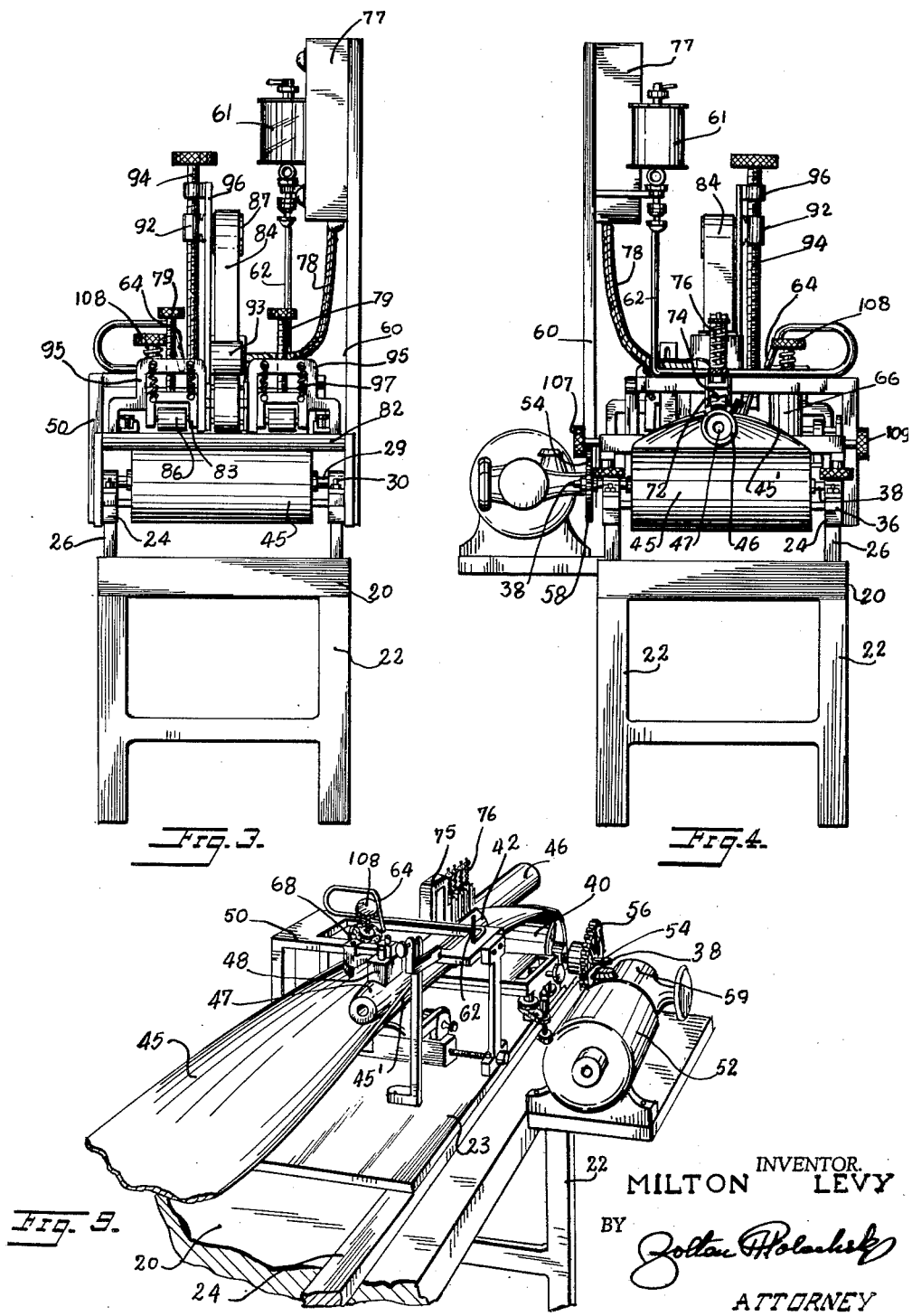

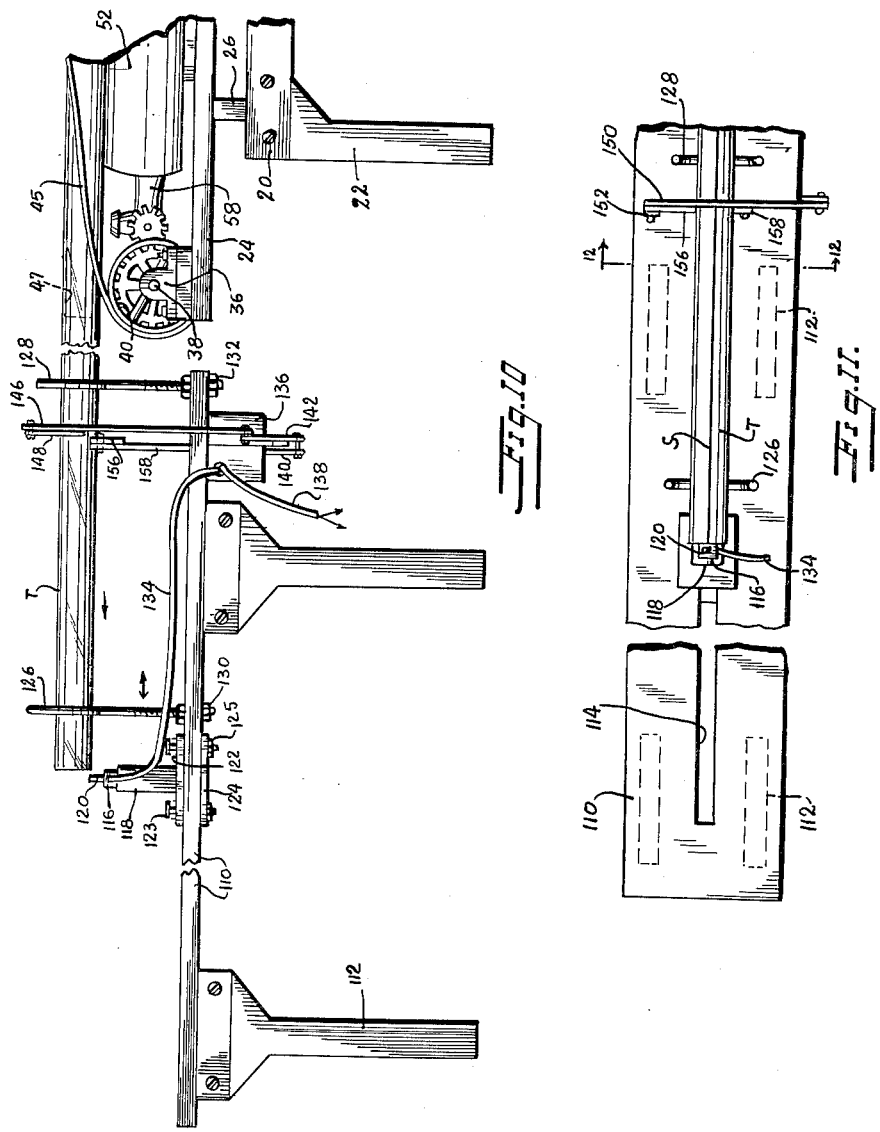

Dec. 4, 1962

M. LEVY 3,066,721

APPARATUS FOR FORMING CYLINDRICAL TUBES WITH JOINED OVERLAPPED EDGES

Filed Aug. 5, 1959

INVENTOR.
MILTON LEVY
BY
ATTORNEY

United States Patent Office 3,066,721
Patented Dec. 4, 1962

3,066,721
APPARATUS FOR FORMING CYLINDRICAL TUBES WITH JOINED OVERLAPPED EDGES
Milton Levy, 259 Green St., Brooklyn, N.Y.
Filed Aug. 5, 1959, Ser. No. 831,774
2 Claims. (Cl. 156—461)

This invention concerns an apparatus for forming tubes of plastic, metal, paper and other materials.

According to the invention thin, pliable sheets of any desired material may be formed into cylindrical tubes by rolling to form overlapped edges and cementing the edges. The apparatus employed for this purpose may receive a sheet of extended length from a bulk supply roll and will form the tube continuously until the roll of sheet material is exhausted. The tube may be cut into any desired lengths while in the apparatus or after removal therefrom.

The basic machine includes an endless moving flexible belt which advances the sheet material from the roll into the machine. A second endless belt advances and guides the sheet material around a heated mandrel to assume the desired cylindrical form with overlapped edges. A quick drying cement is applied to overlapped edges of the tube and the cement sets solid due to conduction of heat from the mandrel. The tube is advanced beyond the mandrel out of the machine continuously. At predetermined distances from the sealing and cementing point semicircular knives may be located for cutting the tube into predetermined lengths. The knives may be actuated automatically by solenoids upon contact of a leading end of the tube with a switch in circuit with the solenoids.

It is therefore a principal object of the invention to provide an apparatus or machine for continuously forming a tube from flat flexible sheet material.

It is another object to provide a machine for forming tubes of predetermined lengths with overlapped edges continuously, the edges being cemented or welded so that a continuous sealed seam is formed.

A further object is to provide a machine in which a sheet of pliable material is drawn from a bulk supply reel by endless belts and guided around a mandrel and under cementing or welding means to form a tube continuously.

A still further object is to provide a machine of the character described provided with means for automatically cutting the tube into sections of predetermined length.

Another object is to provide a machine of the character described with adjustment means whereby materials of different thicknesses may be formed into tubes and whereby tubes of different diameters may be formed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a machine embodying the invention.

FIG. 2 is a top plan view of the machine.

FIG. 3 is a front end elevational view of the machine.

FIG. 4 is a rear end elevational view of the machine.

FIG. 5 is an elevational sectional view on an enlarged scale taken on line 5—5 of FIG. 2.

FIGS. 6 and 7 are fragmentary longitudinal sectional views on an enlarged scale taken on lines 6—6 and 7—7, respectively, of FIG. 2.

FIG. 8 is an elevational section taken on line 8—8 of FIG. 7, on an enlarged scale, showing portions of a belt tensioning device employed in the machine.

FIG. 9 is a perspective view of a rear portion of the machine.

FIG. 10 is a side elevational view of an extension of the machine showing a tube cutting device associated therewith.

FIG. 11 is a top plan view of the machine extension.

Figure 12:
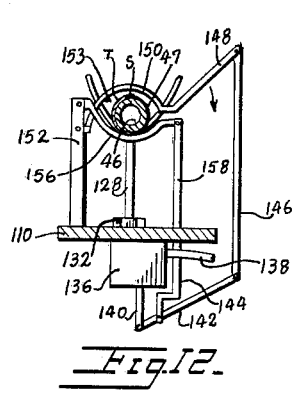

FIG. 12 is a sectional view taken on line 12—12 of FIG. 11.

Figure 13:
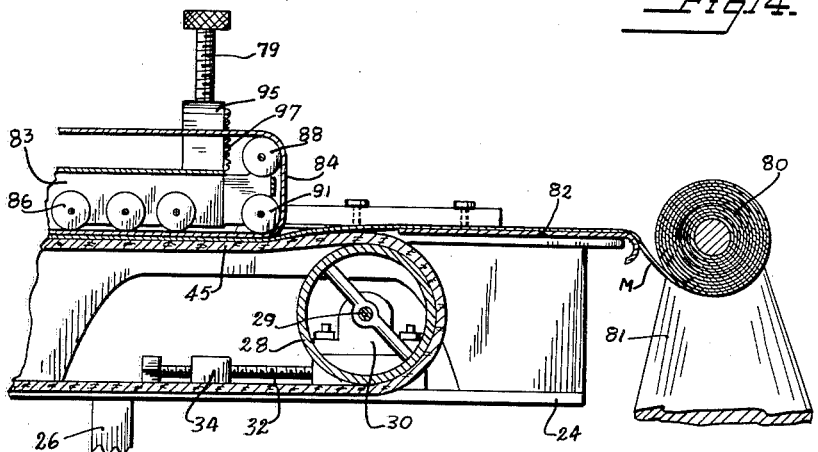

FIG. 13 is a fragmentary sectional view similar to FIG. 7 showing sheet material being fed into the machine for forming into a tube.

Figure 14:
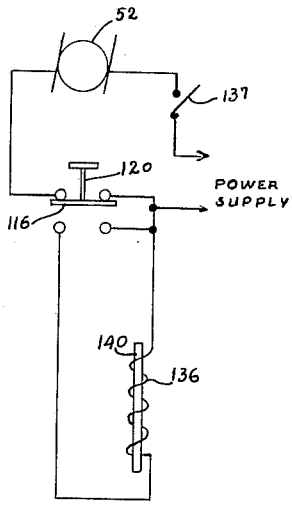

FIG. 14 is an electrical diagram of a circuit which may be used in controlling operation of the machine.

Referring to FIGS. 1 to 9, there is shown a rectangular table or stand 20 having legs 22 for supporting the machine in an elevated position above floor F. The machine has a platform 23 mounted on base bars 24 supported on legs 26 resting on the table. At the forward end of the machine is a roller 28 journaled on a shaft 29 carried in a bearing assembly 30. This assembly is adjustably positioned on the platform 24 by means of an adjustment screw 32 threaded in a stationary nut block 34. At the rear end of the platform is supported another bearing assembly 36 in which is journaled a shaft 38 carrying another roller 40. Entrained over these rollers 28 and 40 is a flexible endless belt 45 made of leather or plastic elastomeric composition material. The belt passes through a cylindrical shell or sleeve 42 open or slotted at its upper end and supported on a base block 44 at a position intermediate the ends of the platform. Concentrically disposed within the shell is a generally cylindrical mandrel 46. The body of the mandrel is cylindrical but at its forward end 47 it is smoothly tapered inwardly. The belt 45 passes between the shell 42 and mandrel 46.

The shell serves as a guide and forming member causing the belt to assume a cylindrical configuration in the region of the shell. Beyond the shell, the belt flattens out to clear the rear cylindrical end of the mandrel and engage on the rear roller 40 as clearly shown in FIGS. 1, 2 and 4.

The mandrel is supported at its forward end by a block 48 carried on a stand or frame structure 50. The mandrel is thus supported in a depending axially horizontal position from the block with its rear cylindrical end horizontally disposed and free from the belt. The belt 45 is driven by a motor 52 carried adjacent the stand 20. The motor drives a pinion gear 54 which drives a larger spur gear 56 mounted on shaft 38. A further speed reducing gear train is disposed in a gear box 59 mounted on the end of the motor.

A board 60 is mounted on the platform 23 and carries a container 61 in which is liquid cement. The cement is discharged through a pipe 62 connected to the lower end of the container and terminating above the mandrel between the forward tapered end of the mandrel and shell 42, just at the point where edges of belt 45 are brought close together to almost a complete cylindrical configuration. An idler roller 63 is disposed below the belt 45 for supporting it in its cylindrical configuration. A tubular member 66 carrying an annular felt sponge 68 is located near the idler roller. The sponge is positioned laterally of the discharge end 64 of pipe 62 and serves to wipe the belt so that if an excess quantity of cement should be deposited on the forming tube and run over the belt it will be collected by the sponge and will run into the tubular member 66. The tubular member 66 may be connected by a pipe 69 to a bucket 70 in which the excess cement will be collected. The bucket is located under the machine as indicated by dotted lines in FIG. 1.

At the top of the mandrel is a horizontally extending bar 72 carrying a plurality of spaced rollers 74. These rollers are adjustably biased by springs 76 and against the mandrel. The bar 72 is supported by a U-shaped member 75 carried by frame structure 50.

On board 60 is an electrical control box 77 to which a source of electrical power is connected via cables (not shown). Cable 78 is connected to the control box and delivers electric power to a heater (not shown) contained in block 48 so that the mandrel is heated while the machine is in operation.

The sheet material M to be formed into a tube is carried on a supply roll 80 mounted on a stand 81 as shown in FIG. 13. The sheet material is drawn over a platen 82 and then passes on to the leading or forward end of belt 45. A cooperating belt assembly is provided for advancing the sheet material through the machine. This assembly includes an endless belt 84 best shown in FIGS. 1 and 7. The belt is entrained over idler rollers 85, 87 and 88, and under idler rollers 89, 90, 91, 93. In order to tension the belt 84 there is provided a vertically adjustable bearing member 92 carried on a screw shaft 94. The shaft is mounted on a bracket 96. In order to adjust the tension to keep the sheet material smooth and flat on belt 45 there are provided two series of rollers 86 carried by bracket bars 83 and vertically adjustable by screws 79 engaged with the bracket bars 83 and carried in turn by bracket guides 95. Springs 97, best shown in FIG. 3, are connected between the bracket bars and bracket guides 95 to prevent vibration of the sheet material on the belt.

Vertical adjustment screws 100—103 are provided for adjustably positioning shell 42 and the spacing between the belt 45 and the mandrel depending on the thickness of the material to be handled in the machine. Horizontal adjustment screws 104, 106 adjustably position the tubular member 66. A vertically disposed screw 108 adjustably positions the sponge 68 on member 66. Screws 107, 109 adjustably position frame structure 111 which carries shell 42 and base block 44.

In FIGS. 10-12 is shown an extension of the machine employed for cutting off predetermined lengths of tubing formed in the machine. The extension includes a platform or table 110 carried on legs 112. A slot 114 is formed in the table. A switch 116 carried on a support 118 has a finger 120 disposed in the path of a tube T shown issuing from the machine. Support 118 is secured to a base plate 122 having screws 123 extending through the plate and slot 114 and secured to a clamp plate 124 by nuts 125 beneath the table. By means of the screws, nuts and clamp plate the position of the switch 116 in the path of the tube can be adjustably located along the table. Two yoke members 126 and 128 are adjustably positioned along the table by means of nuts 130, 132. The yoke members have lower threaded ends engaged with the nuts. Electrically connected with switch 116 by a cable 134 is a solenoid 136 mounted at the underside of the table. This solenoid is energized via a cable 138. The solenoid has a plunger 140 to which is connected a link 142 carried pivotally on a bracket bar 144.

The link 142 is connected to another link 146 engaged at the end of an arm 148 extending angularly upward. The arm is located at the end of a curved knife blade 150 pivotally mounted on a bracket arm 152 having a sharp edge 153 adapted to coact with a sharp edge of a stationary curved knife blade 156. Blade 156 is carried by arm 152 and another bracket arm 158, both arms extending up from and secured in the table top. The tube T passes through the knife blades and is cut thereby when the solenoid is energized.

In operation of the apparatus, the sheet M which may be plastic, metal such as aluminum, steel or copper, paper, or other material is drawn off the roll 80 and passes over platen 82 on to belt 45 as it passes over roller 28. The belt is flat at this forward location. The sheet M passes under the rollers 86 and the flat horizontal bottom section of belt 84. The sheet is carried up with the belt 45 as the belt is turned up at its sides at 45' around the mandrel 46. The narrow tapered end 47 of the mandrel acts as a guide for the belt and sheet material. The edges of the sheet are brought to an overlapping position as they pass the discharge end 64 of the pipe 62. The liquid cement is deposited upon the edges of the sheet and the cement moistened edges then are caused to overlap as the sheet is drawn between the belt and the mandrel at the location of the shell or sleeve 42. The rollers 74 press the cemented edges while the cement dries rapidly due to the heated state of the mandrel, so that a continuous cemented seam S is formed in the tube. The tube T leaves the rear cylindrical portion of the mandrel as the edges of the belt 45 are drawn laterally to enter upon roller 40.

The tube T advances on to the yoke members 126 and 128 until the free end of the tube reaches finger 120 of the switch 116. The contact of the tube with the switch finger closes the electric power supply circuit of solenoid 136 causing the plunger 140 to be retracted. Links 142 and 146 are then pivoted causing the knife blade 150 to be drawn down so that the tube is cut between blades 150 and 156.

If desired, the motor 52 can be placed in a circuit with the solenoid 136 as shown in FIG. 14 so that when switch 116 is operated the motor stops while the solenoid operates to cut the tube which will then be stationary. Alternatively the motor can be provided with a manually operable switch 137 for opening and closing its power supply circuit. If the motor is stopped automatically when the solenoid is actuated, the motor will remain stopped until the cut portion of the tube is removed permitting the switch finger 120 to be released.

The circuit of FIG. 14 may be used to effect automatic operation of the solenoid and stopping of the motor. After the cut tube section is removed the apparatus will automatically resume drawing sheet material M from the roll and forming tube T therefrom. The switch 116 can be located any distance along the table 110 so that various lengths of the tube can be cut.

If it is necessary to pass thinner or thicker sheet material through the machine, the screws 79 may be adjusted to vary the spacing of the rollers 86 from the sheet. Also, the tension in belt 84 will be readjusted by means of screw 94. This readjustment will be necessary because the forward and rear rollers 90 and 91 carrying belt 84 are mounted on bracket bars 83 along with roller 86 and are adjustably positioned therewith. The base block 44 can be raised or lowered to accommodate different thicknesses of sheet material by adjusting screws 100—103.

If desired, it is possible to apply heat via rollers 74 to effect a welding of the seam S formed in the tube in addition to or instead of applying liquid cement.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An apparatus for forming tubes continuously from a continuous supply of flat plastic sheet material, comprising stationary flat guide means for receiving said sheet material from said supply, a first endless belt, drive means movably supporting a portion of the belt horizontally so that said portion receives the sheet material from said guide means, a second endless belt, means movably supporting a part of the second belt over said portion of the first belt so that the sheet material is engaged and advanced therebetween, a stationary cylindrical mandrel having a tapered end, said mandrel overlaying another portion of the first belt with said tapered end spaced from the second belt so that the sheet material passes under the mandrel while being conveyed by the first belt, a stationary rigid cylindrical shell concentric with said mandrel and radially spaced therefrom, said other portion of the first belt passing between the mandrel and shell and assuming a cylindrical configuration thereat, said sheet material being drawn by the first belt between the mandrel and shell and assuming a tubular shape inside the shell, drive means including a motor driven cylindrical roller continuously receiving the first belt, and means receiving the tubular shaped material as it leaves the mandrel and shell.

2. An apparatus according to claim 1, further wherein said shell has an open portion extending longitudinally thereof, and means for continuously securing adjacent edges of the tubular shaped material together at said open portion of the shell to form a continuous tube.

References Cited in the file of this patent

UNITED STATES PATENTS

| | | |
|---|---|---|
| 2,254,394 | Ratley et al. | Sept. 2, 1941 |
| 2,587,211 | Piazze | Feb. 26, 1952 |
| 2,595,421 | Spalding | May 6, 1952 |
| 2,660,219 | Haas et al. | Nov. 24, 1953 |
| 2,665,757 | Stevens et al. | Jan. 12, 1954 |
| 2,673,495 | Hecker et al. | Mar. 30, 1954 |
| 2,718,915 | Piazze | Sept. 27, 1955 |
| 2,732,882 | Kuts | Jan. 31, 1956 |
| 2,741,956 | Diffenbaugh | Apr. 17, 1956 |
| 2,768,673 | Gaubert et al. | Oct. 30, 1956 |
| 2,934,130 | Lane et al. | Apr. 26, 1960 |
| 2,941,570 | Plym | June 21, 1960 |
| 2,950,658 | Moser et al. | Aug. 30, 1960 |